Sept. 24, 1946. S. J. WEEKS 2,408,132
AUTOMATIC TOP
Filed April 20, 1945 2 Sheets-Sheet 1

Inventor
Sanford Joseph Weeks
By McMorrow Brennan
Attorneys

Sept. 24, 1946.　　　　S. J. WEEKS　　　　2,408,132
AUTOMATIC TOP
Filed April 20, 1945　　　2 Sheets-Sheet 2
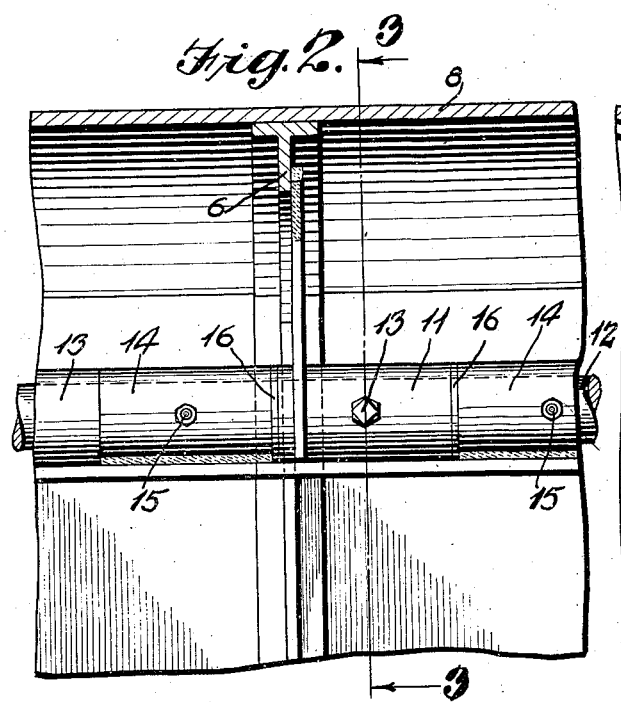
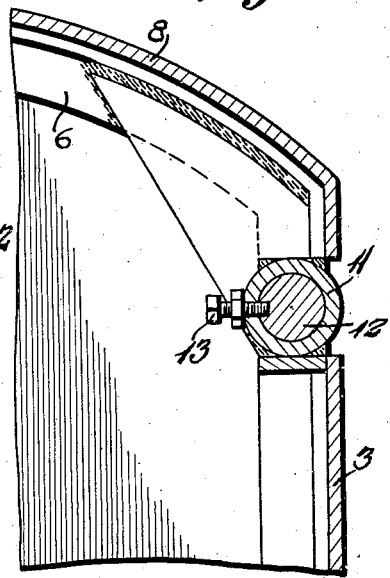
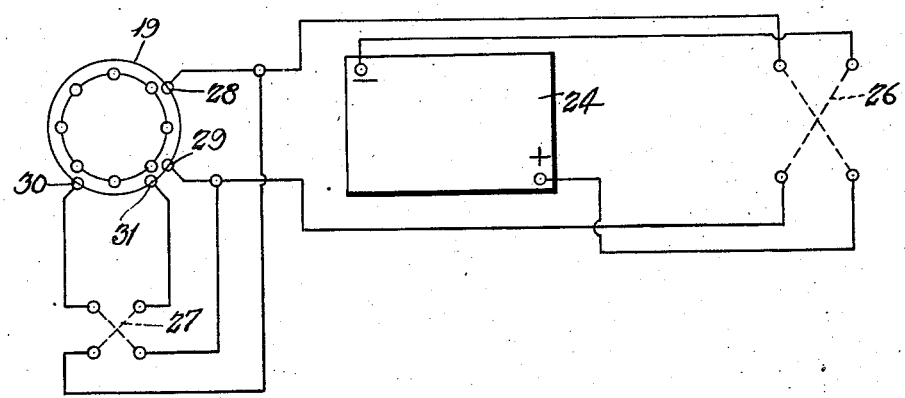
Inventor
Sanford Joseph Weeks Patented Sept. 24, 1946

2,408,132

UNITED STATES PATENT OFFICE 2,408,132

AUTOMATIC TOP

Sanford J. Weeks, Elyria, Ohio

Application April 20, 1945, Serial No. 589,379

3 Claims. (Cl. 296—137)

This invention relates to doors and operating mechanism therefor and more particularly to door operating mechanism for operating top doors in vehicles such as in trailer trucks.

A main object of the invention is to provide a novel and improved top door and operating means therefor for a vehicle.

A further object of the invention is to provide an improved vehicle top door operating mechanism which is extremely simple in construction and operation and is substantially tamper-proof.

Further objects and advantages of the invention will appear from the following description and claims, and from the accompanying drawings, wherein:

Figure 2 is a detail view showing the hinge structure of the top doors of Figure 1.

Figure 3 is a cross-sectional view taken on line 3—3 of Figure 2.

Figure 5 is a circuit diagram of the electrical connections of equipment employed in the mechanism of Figure 1.

Figure 4:
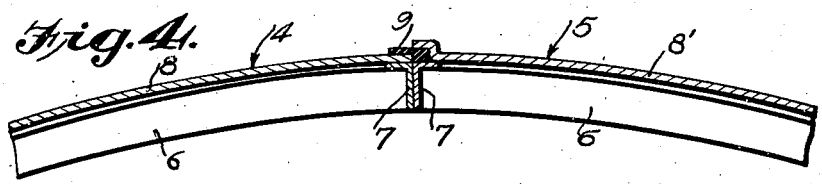
Figure 4 is a detail view showing the sealing means employed with the top doors of Figure 1.

Referring to the drawings, 1 designates the body of a trailer truck having forward wall 2 and side walls 3, 3. The top of body 1 comprises a pair of hinged doors 4 and 5 forming an arched roof for the body 1 when in closed position. Each door comprises a plurality of T-shaped transverse members 6 connected at their inner ends by longitudinal angle members 7, covering plates 8 and 8' of sheet metal being welded to the flanges of said transverse members 6 and said angle members 7 for the respective doors 4 and 5. The inner longitudinal edge of cover plate 8' is upwardly offset to form a recess in which is secured a sealing strip 9 of rubber or similar material adapted to provide a waterproof seal between doors 4 and 5 when they are in closed position, as shown in Figure 4.

Welded to the web portions of transverse members 6 adjacent their outer ends are downwardly extending gusset members 10, the lower portions of said gusset members each being welded to a short sleeve member 11 mounted on a longitudinal shaft 12 and secured to said shaft by a set screw 13. Shaft 12 extends for the length of the side wall and is rotatably supported in a plurality of stationary sleeve members 14 rigidly secured to side wall 3 by welding. Each sleeve member 14 is provided with a lubricant fitting 15 through which lubricant is fed to shaft 12. Washer members 16 are provided between rotary sleeve members 11 and stationary sleeve members 14. The welds around sleeves 11 and 14 are built up to provide a substantially waterproof hinged joint between the doors and the side walls 3.

Mounted on forward wall 2 in the central longitudinal plane of body 1 are a pair of vertically spaced bracket members 17, 17 in which is journaled a vertical threaded shaft 18, the lower end of which is coupled to the top end of the armature shaft of a vertically mounted motor 19. The lower end of said armature shaft is formed to be at times engaged by a hand crank 20 when it is desired to rotate shaft 18 manually.

Threadedly engaged with shaft 18 is a collar member 21 formed with laterally projecting lug portions, each lug portion being pivotally secured to the lower end of an arm 22. The upper end of each arm 22 is pivotally secured to the intermediate portion of the web of the end transverse member 6 of the respective doors 4 and 5. When shaft 18 is rotated collar member 21 will move vertically, causing doors 4 and 5 to swing upwardly around their hinges when said collar member moves upwardly for one direction of rotation of shaft 18 and reversing the motion of said doors when shaft 18 rotates in the opposite direction.

Figure 1:
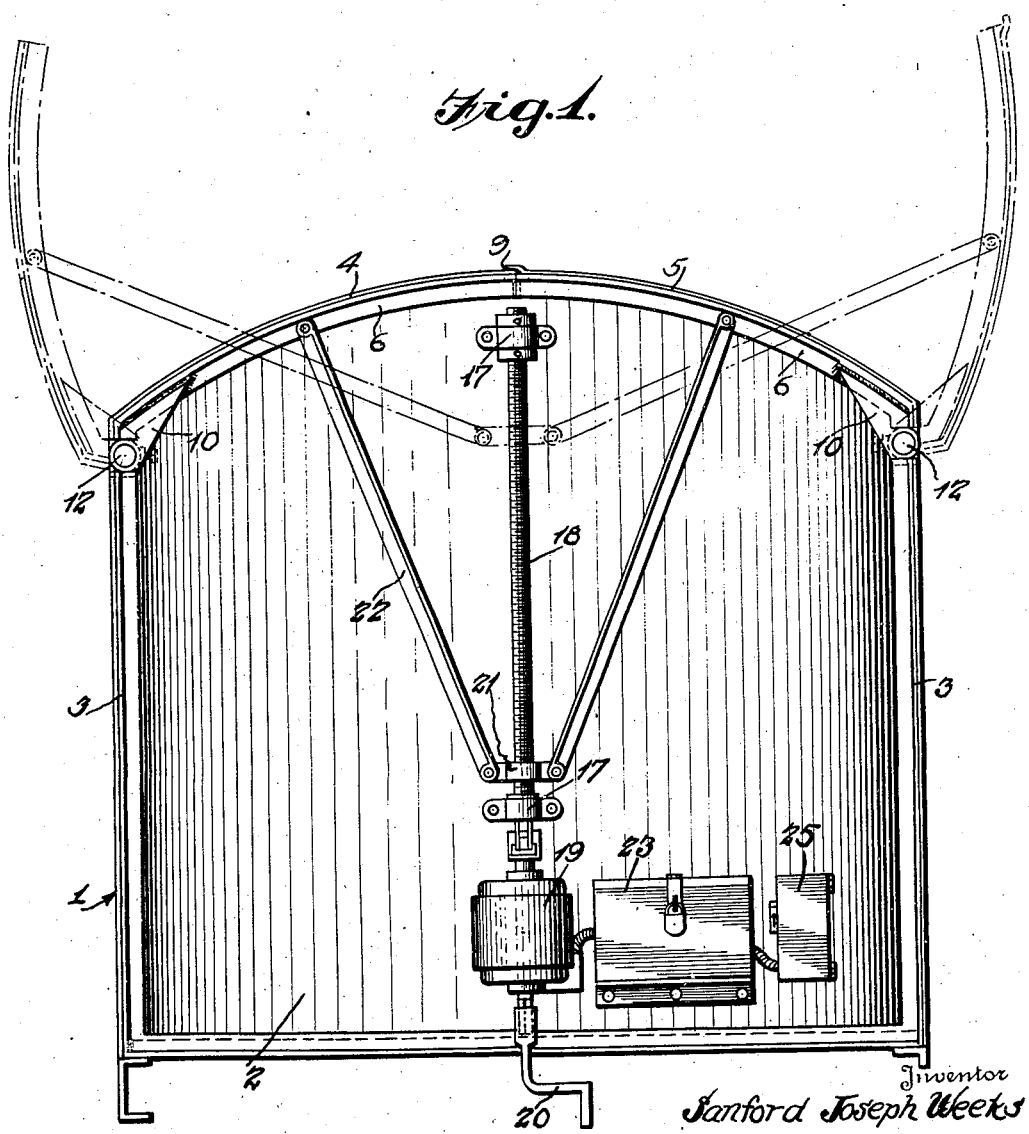
Figure 1 is an elevational view of top doors and operating mechanism therefor for a trailer truck body in accordance with this invention, looking toward the forward end wall thereof.

Motor 19 is a reversible direct current motor adapted to be operated by a storage battery. Provided in a box 23 is an appropriate battery 24. Box 23 is adapted to be secured in closed condition by an appropriate hasp means and padlock, as shown in Figure 1. Mounted adjacent box 23 is a lockable switch box 25 containing a first reversing switch 26 and a second reversing switch 27, each being of the double-pole, double-throw type. The armature terminals 28 and 29 of motor 19 are connected reversibly to the terminals of battery 24 by switch 26, whereas the field terminals 30 and 31 of motor 19 are connected reversibly to armature terminals 28 and 29 by switch 27. For a given setting of switch 26 the direction of motor 19 may thus be reversed by throwing switch 27 from one position to another to thereby reverse its field excitation. Doors 4 and 5 will therefore be opened with switch 27 in one position and will be closed when switch 27 is thrown to the other position. Switch 26 may be employed as a main power switch.

If motor 19 is rendered inoperative by failure of battery 24 or for any other reason, the doors may be opened manually by hand crank 20, which may normally be carried in the driver's compartment of the truck.

While a specific embodiment of trailer truck door structure and operating mechanism therefor has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A top door structure for vehicle bodies comprising first and second arcuate rigid plate members, transverse members secured to each of said plate members at spaced points, gussets secured adjacent the outer extremities of said transverse members, sleeves secured to each of said gussets, first and second side walls for said body, additional sleeves extending the full length of each of said side walls at the top thereof, and having cut-away portions of a dimension to permit alignment of said first-mentioned sleeves therewith, said first-mentioned sleeves and said additional sleeves being of substantially the same interior and exterior diameter, shafts extending the full length of each side wall through aligned first-mentioned and additional sleeves, and means securing said first-mentioned sleeves to said shafts, said shafts being freely rotatable in said additional sleeves to form a water-tight hinge structure extending the full length of said vehicle body.

2. A top door structure for vehicle bodies comprising first and second arcuate rigid plate members, transverse members secured to each of said plate members at spaced points, gussets secured adjacent the outer extremities of said transverse members, sleeves secured to each of said gussets, first and second side walls for said body, additional sleeves extending the full length of each of said side walls at the top thereof, and having cut-away portions of a dimension to permit alignment of said first-mentioned sleeves therewith, said first-mentioned sleeves and said additional sleeves being of substantially the same interior and exterior diameter, shafts extending the full length of each side wall through aligned first-mentioned and additional sleeves, means securing said first-mentioned sleeves to said shafts, said shafts being freely rotatable in said additional sleeves to form a water-tight hinge structure extending the full length of said vehicle body, and lubricating fittings associated with each of said first-mentioned sleeves.

3. A top door structure for vehicle bodies comprising first and second arcuate rigid plate members, transverse members secured to each of said plate members at spaced points, gussets secured adjacent the outer extremities of said transverse members, sleeves secured to each of said gussets, first and second side walls for said body, additional sleeves extending the full length of each of said side walls at the top thereof, and having cut-away portions of a dimension to permit alignment of said first-mentioned sleeves therewith, said first-mentioned sleeves and said additional sleeves being of substantially the same interior and exterior diameter, shafts extending the full length of each side wall through aligned first-mentioned and additional sleeves, means securing said first-mentioned sleeves to said shafts, said shafts being freely rotatable in said additional sleeves to form a water-tight hinge structure extending the full length of said vehicle body, lubricating fittings associated with each of said first-mentioned sleeves, and washers positioned between adjacent ends of each of said first-mentioned sleeves and said additional sleeves.

SANFORD J. WEEKS.